Patented Mar. 20, 1928.

1,663,229

UNITED STATES PATENT OFFICE.

ROGER ADAMS AND JAMES MEYER DAVIDSON, OF URBANA, ILLINOIS, AND IVAN GUBELMANN, OF SOUTH MILWAUKEE, WISCONSIN, ASSIGNORS TO THE NEWPORT COMPANY, OF CARROLLVILLE, WISCONSIN, A CORPORATION OF DELAWARE.

3,4 DIAMINO BENZOYL O-BENZOIC ACIDS AND PROCESS OF MAKING THE SAME.

No Drawing. Application filed September 13, 1926. Serial No. 135,293.

This invention relates to certain derivatives of benzoyl o-benzoic acid containing two amino groups and provides a new series of compounds. These compounds may be prepared by the reduction of 4-amino or 4-substituted amino 3-nitro benzoyl o-benzoic acids and are 4-amino or 4-substituted amino, 3-amino benzoyl o-benzoic acids. The following equation represents the general reaction involved, where R represents a hydrogen atom, or an alkyl, aryl or substituted alkyl or aryl group.

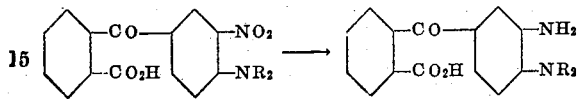

These diamino compounds are valuable as dye intermediates because upon treatment with concentrated sulfuric acid, water is eliminated and a mixture of 1,2 and 2,3 diamino anthraquinones is produced. It is not necessary to use the diamino benzoyl o-benzoic acids themselves, but it is quite satisfactory to treat the hydrochlorides or other salts of the diamino benzoyl o-benzoic acids with sulfuric acid in order to obtain the anthraquinones.

In the general method of synthesizing compounds of this series, a compound, 4-amino or 4-substituted amino 3-nitro benzoyl o-benzoic acid is heated with iron powder, a little water and a very small amount of acetic acid or mineral acid until the reduction is complete. Sodium hydroxide solution is then added, the solution filtered from the iron and iron oxide and the 3,4 diamino benzoyl o-benzoic acid precipitated as the hydrochloride by adding concentrated hydrochloric acid in the proper amounts.

The compounds may also be reduced catalytically or with other common reducing agents.

Without limiting our invention to any particular procedure, the following example in which parts by weight are given illustrates the application of our invention in the preferred form.

Specific example.

Twenty parts of pure 3-nitro 4-amino benzoyl o-benzoic acid was thoroughly mixed with three times its weight of powdered iron. About 3 parts by volume of 30% acetic acid was added and enough water to make a thick paste. This was heated with steam and mechanically stirred. Water was added from time to time to keep the consistency a thin paste, and small amounts of iron were added occasionally. After no more heat was evolved by the reaction it was heated somewhat longer to make certain of complete reduction. The reaction mixture was treated with 10% sodium hydroxide solution in sufficient amount to dissolve the diamino acid and filtered hot. The filtrate, yellow in color, was acidified with concentrated hydrochloric acid until the precipitate just dissolved. On standing and cooling, the mono-hydrochloride of 3,4 diamino benzoyl o-benzoic acid separated as a tan colored precipitate. The product is readily purified by crystallizing from water though the color is not entirely removed by this procedure. The purified substance does not melt under 350° C.

The free base, 3,4 diamino benzoyl benzoic acid may be recrystallized from water. It forms crystals, generally pinkish in color, which melt at 176–177° C.

We are aware that numerous details of the process may be varied through a wide range without departing from the principles of this invention, and we do not desire limiting the patent granted otherwise than necessitated by the prior art.

We claim as our invention:

1. As new articles of manufacture, compounds of the general formula

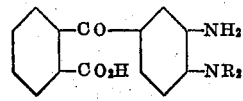

where R represents a hydrogen atom, or an alkyl, aryl or substituted alkyl or substituted aryl group.

2. As new articles of manufacture, the compound 3,4 diamino benzoyl o-benzoic acid of the formula.

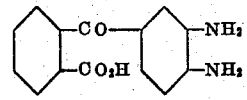

3. The method of preparing compounds of the general formula

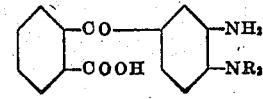

in which R represents a hydrogen atom, an alkyl, aryl, or substituted alkyl or substituted aryl group; which comprises reducing the corresponding 3'-nitro, 4'-amino-benzoyl-o-benzoic acid with powdered iron and acetic acid, filtering the iron sludge from the reduction mass and isolating the final product by the addition of hydrochloric acid to the filtrate.

In testimony whereof we have hereunto subscribed our names.

ROGER ADAMS.
JAMES MEYER DAVIDSON.
IVAN GUBELMANN.